(12) United States Patent
Imashuku

(10) Patent No.: US 10,415,006 B2
(45) Date of Patent: Sep. 17, 2019

(54) METHOD AND APPARATUS FOR PRODUCING BEER OR BEER-LIKE BEVERAGE, AND BEER AND BEER-LIKE BEVERAGE

(71) Applicant: ASAHI BREWERIES, LTD., Tokyo (JP)

(72) Inventor: Hisato Imashuku, Suita (JP)

(73) Assignee: ASAHI BREWERIES, LTD., Tokyo (JP)

( * ) Notice: Subject to any disclaimer, the term of this patent is extended or adjusted under 35 U.S.C. 154(b) by 0 days.

(21) Appl. No.: 15/554,959

(22) PCT Filed: Feb. 22, 2016

(86) PCT No.: PCT/JP2016/055095
§ 371 (c)(1),
(2) Date: Aug. 31, 2017

(87) PCT Pub. No.: WO2016/143496
PCT Pub. Date: Sep. 15, 2016

(65) Prior Publication Data
US 2018/0087011 A1 Mar. 29, 2018

(30) Foreign Application Priority Data
Mar. 10, 2015 (JP) .................... 2015-047406

(51) Int. Cl.
*C12C 12/00* (2006.01)
*C12C 3/00* (2006.01)
(Continued)

(52) U.S. Cl.
CPC ............. *C12C 12/00* (2013.01); *C12C 3/00* (2013.01); *C12C 5/02* (2013.01); *C12C 7/00* (2013.01); *C12C 13/00* (2013.01)

(58) Field of Classification Search
CPC .... C12C 3/00; C12C 5/02; C12C 5/026; C12C 7/285
(Continued)

(56) References Cited

U.S. PATENT DOCUMENTS 2,898,209 A * 8/1956 Murtaugh et al.
2014/0220222 A1 8/2014 Murakami et al.

FOREIGN PATENT DOCUMENTS

| CN | 203960171 U | 11/2014 |
|---|---|---|
| EP | 0 875 559 A2 | 11/1998 |
| GB | 1044849 A | 10/1966 |
| JP | 10-323174 A | 12/1998 |
| JP | 2003-251175 A | 9/2003 |
| JP | 2013-042674 A | 3/2013 |

(Continued)

OTHER PUBLICATIONS

Michael Dresel et al., "From wort to beer: the evolution of hoppy aroma of single hopped beers produced by early kettle hopping, late kettle hopping and dry hopping", 34th Congress European Brewery Convention, May 1, 2013, pp. 1-2, XP055496103, Retrieved from the Internet: <URL:https://www.researchgate.net/publication/271848238_from_wort_to_Beer_The_evlolution_of_hoppy_aroma_of_single_hopped_beers_produced_by_early_kettle_hopping_late_kettle_hopping_and_dry_hopping> [retrieved on Jul. 30, 2018] (2 pages total).

(Continued)

*Primary Examiner* — Helen F Heggestad
(74) *Attorney, Agent, or Firm* — Sughrue Mion, PLLC

(57) ABSTRACT

A method for producing a beer or a beer-like beverage with a pure and mild hop aroma having a slight raw hop odor, which includes maintaining a hop-mixed liquid in a tank, which liquid contains a hop and a solvent, at a temperature less than the boiling point of the solvent, wherein at least a part of the hop-mixed liquid is withdrawn from the tank, and the liquid is supplied to an empty portion of the tank, again, (Continued)

to circulate the hop-mixed liquid through the tank. Also disclosed is an apparatus for producing the beer or beer-like beverage.

6 Claims, 14 Drawing Sheets

(51) Int. Cl.
*C12C 7/00* (2006.01)
*C12C 13/00* (2006.01)
*C12C 5/02* (2006.01)

(58) Field of Classification Search
USPC .......... 426/29, 590, 592, 600; 99/278, 289 R
See application file for complete search history.

(56) References Cited

FOREIGN PATENT DOCUMENTS

| JP | 5420631 B2 | 2/2014 |
| JP | 2014-128241 A | 7/2014 |
| JP | 2014-236709 A | 12/2014 |

OTHER PUBLICATIONS

Extended European Search Report dated Aug. 10, 2018 issued by the European Patent Office in counterpart application No. 16761468.4.
International Search Report of PCT/JP2016/055095 dated Apr. 12, 2016 [PCT/ISA/210].

\* cited by examiner

METHOD AND APPARATUS FOR PRODUCING BEER OR BEER-LIKE BEVERAGE, AND BEER AND BEER-LIKE BEVERAGE

CROSS REFERENCE TO RELATED APPLICATIONS

This application is a National Stage of International Application No. PCT/JP2016/055095, filed Feb. 22, 2016, claiming priority based on Japanese Patent Application No. 2015-047406, filed Mar. 10, 2015, the contents of all of which are incorporated herein by reference in their entirety.

TECHNICAL FIELD

The present invention relates to a method and an apparatus for producing a beer or a beer-like beverage as well as a beer and a beer-like beverage.

Through the present invention, the term "beer or beer-like beverage" is used in the sense that, in addition to beers and low-malt beers currently provided in the Japanese Liquor Tax Act and the related laws and regulations, the term covers so-called "the third beers" in Japan (or quasi-beers), beer-taste beverages, etc. In order to simplify the explanation in the present description, the term "beer or beer-like beverage" is sometimes referred to just as "beer". However, this is a representative term for the "beer or beer-like beverages", and it should be understood that these explanations are also applicable to low-malt beers and other beer-like beverages.

BACKGROUND ART

For a production process of a beer, there is a well-known step wherein a hop is added to a wort, and then, the mixture is boiled for a preparation procedure before fermentation and lager (see, for example, Patent Literatures 1 and 2 below). Such boiling of wort is carried out for the purpose of giving a bitter taste from the hop to the wort, and removing unnecessary odorant(s) by evaporation, such as dimethylsulfide (DMS), particularly, which is derived from a malt, etc.

Recently, a method for producing a beer in order to emphasize hop-derived odors is also developed (see, for example, Patent Literature 3 below).

PRIOR ART DOCUMENTS

Patent Literatures

Patent Literature 1: JP H10-323174 A
Patent Literature 2: JP 2003-251175 A
Patent Literature 3: JP 5420631 B

SUMMARY OF INVENTION

Problems to be Solved by the Invention

The hop contains odorants such as a "hop aroma component" such as linalool which can provide an odor like a flower or a fruit; a "raw hop odor component" such as myrcene which provides a greenly order like a raw hop or a resin-like order (e.g., a wax-like order), etc. As described above, the addition of the hop to the wort, and the subsequent boiling of the mixture can give an inherent odor and a bitter taste, and the like, to the resulting beer.

Recently, it is interested in the odor derived from the hop, and an attempt such as emphasizing the odor is conducted. In order to emphasize the odor of the hop, while the undesired "raw hop odor component" is removed by evaporation during the boiling, the desired "hop aroma component" is also simultaneously removed together with such "raw hop odor component". Therefore, adversely, there was a problem where the floral or fruity odor derived from the hop was reduced (hereinafter, which may be referred to as "hop aroma").

Moreover, in order to increase the residual rate of the desired "hop aroma component", if the boiling period is shortened, the "raw hop odor component" is remaining. Therefore, adversely, there was a problem where the hop aroma is interfered with the raw hop odor component.

Herein, the inventor takes into these problems in order to provide a method and an apparatus for producing a beer or a beer-like beverage with a pure and mild hop aroma having a slight raw hop odor, and the beer or the beer-like beverage having such inherent hop aroma, without substantially reducing the amount of the above-described "hop aroma component", among the odorants derived from the hop, with the amount of the undesired "raw hop odor component" being remarkably reduced.

Means for Solving the Problems

The present inventor intensively investigated, and found that the amount of the undesired "raw hop odor component" could be significantly reduced, without substantially reducing the amount of the desired "hop aroma component" derived from the hop, by maintaining (or retaining or preserving) a mixed liquid containing a hop and a solvent which is described in detail below (hereinafter, which is referred to as "hop-mixed liquid"), in a tank, at a temperature less than the boiling point of the solvent contained in the hop-mixed liquid, wherein at least a part of the hop-mixed liquid is withdrawn from the tank, and the liquid is supplied to an empty portion of the tank, again, as a circulation cycle, and the hop-mixed liquid is circulated through the tank, while the hop-mixed liquid is maintained in the tank at the temperature. As a result, the present invention is accomplished.

Hereinafter, the present invention provides a method and an apparatus for producing a beer or a beer-like beverage, and a beer or a beer-like beverage, and the like. However, the present invention is not limited to those described below.

[1]
A method for producing a beer or a beer-like beverage, which comprises maintaining a hop-mixed liquid in a tank, which liquid contains a hop and a solvent, at a temperature less than the boiling point of the solvent, wherein at least a part of the hop-mixed liquid is withdrawn from the tank, and the liquid is supplied to an empty portion of the tank, again, to circulate the hop-mixed liquid through the tank.

[2]
The production method according to the item [1] above, wherein the solvent is water; a liquid wherein at least one of additives selected from the group consisting of acids, alkalis, salts, flavoring agents, acidulants, emulsifying agents, sweetening agents, bittering agents, saccharides, sugar syrups, starches, dietary fibers, food colors, coloring agents, barley extracts, malt extracts and yeast extracts is added to water; or a juice derived from at least one of plant materials selected from the group consisting of grains, beans, potatoes and sugarcanes.

[3]
The production method according to the item [1] or [2] above, wherein a proportion of the hop to the solvent in the hop-mixed liquid is 15000 ppm or less, as a basis of the weight, wherein a calculated value based on α (alpha) acids is employed as the weight of the hop.

[4]
The production method according to any one of the items [1] to [3] above, wherein the hop-mixed liquid is maintained at a temperature from 40° C. or more to a temperature less than the boiling point of the solvent.

[5]
The production method according to any one of the items [1] to [4] above, wherein the hop-mixed liquid is maintained at a temperature from 80° C. or more to a temperature less than the boiling point of the solvent.

[6]
An apparatus for producing a beer or a beer-like beverage, comprising:
    a tank for accommodating a hop-mixed liquid which contains a hop and a solvent,
    a solvent supplying line for supplying a solvent to the tank; and
    a circulation line for withdrawing at least a part of the hop-mixed liquid from the tank and returning the liquid to the tank, again,
wherein at least a part of the hop-mixed liquid is withdrawn from the tank, and, through the circulation line, the hop-mixed liquid is supplied to an empty portion of the tank.

[7]
The apparatus according to the item [6] above, which further comprises at least one of heaters selected from the group consisting of a heater attached to the tank or the circulation line for heating the hop-mixed liquid, and a heater attached to the solvent supplying line for heating the solvent.

[8]
A beer or a beer-like beverage, which is obtained/obtainable by the production method according to any one of the items [1] to [5] above.

Effects of the Invention

The present invention can provide a production method and an apparatus, which can add a pure and mild hop aroma with a slight raw hop odor to a beer or a beer-like beverage, without substantially reducing the amount of the desired "hop aroma component" derived from the hop, with the amount of the undesired "raw hop odor component" being significantly reduced, as well as the beer or the beer-like beverage with the pure and mild hop aroma having the slight raw hop odor.

DESCRIPTION OF EMBODIMENTS

Hereinafter, the present invention is described in detail. Initially, the apparatus according to the present invention is briefly described.

<Production Apparatus>

The apparatus according to the present invention is an apparatus for producing a beer or a beer-like beverage, which comprises:
    a tank for accommodating a hop-mixed liquid,
    a solvent supplying line for supplying a solvent to the tank; and
    a circulation line for withdrawing at least a part of the hop-mixed liquid from the tank and returning the liquid to the tank, again.

In the apparatus according to the present invention, at least a part of the hop-mixed liquid is withdrawn from the tank, and, through the circulation line, the hop-mixed liquid is supplied to an empty portion of the tank, and thereby, the hop-mixed liquid can be circulated through the tank.

Figure 1:
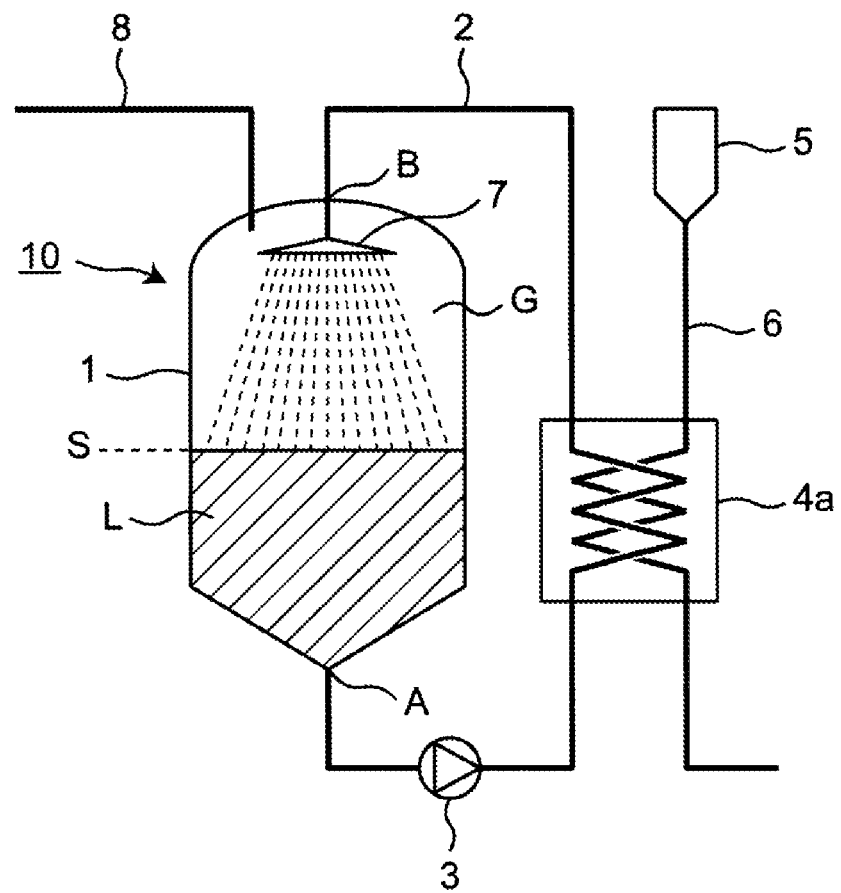
FIG. 1 is a schematic view of an apparatus according to the first embodiment of the present invention.

The apparatus according to the present invention can be configured, for example, as shown in an apparatus 10 according to the first embodiment illustrated in FIG. 1, as a circulation system, so that at least a part of a hop-mixed liquid L can be withdrawn at any location lower than the liquid surface S of the hop-mixed liquid L in the tank 1 (e.g., outlet A), and, through a circulation line 2, the hop-mixed liquid can be supplied to an empty portion G of the tank 1 at any location upper than the liquid surface S of the hop-mixed liquid L contained in the tank 1 (e.g., inlet B), again. If necessary, a pump 3 may be provided for the circulation line 2 so that the apparatus can be configured to be able to accelerate the circulation of the hop-mixed liquid L.

In the illustrated embodiment, the tank 1 is described as a tank having a general cylindrical configuration with a general circular cross section. However, in the present invention, the configuration of the tank is not limited to such configuration. As far as the hop-mixed liquid L can be withdrawn from the tank 1 and supplied to the empty portion G of the tank 1, the location on the tank 1, to which the circulation line 2 is connecting, is not particularly limited. Therefore, the outlet A may be placed at any location lower than the liquid surface S of the hop-mixed liquid L contained in the tank 1. The outlet A may be placed at the bottom or the side of the tank 1. The inlet B may be placed at any location upper than the liquid surface S of the hop-mixed liquid L contained in the tank 1. The inlet B may be placed at the top or the side of the tank 1. In the present invention, the "empty portion" of the tank means a part upper than the liquid surface S of the hop-mixed liquid L in the tank.

For example, as shown in the apparatus 10 according to the first embodiment illustrated in FIG. 1, the apparatus according to the present invention comprises a solvent supplying line 8 for preparing the hop-mixed liquid L or adjusting the concentration of the liquid. The solvent supplying line 8 can be attached to any location of the tank 1. For example, as shown in the figure, the exit of the solvent supplying line 8 may be placed in the empty portion of the tank 1.

The apparatus according to the present invention further may comprise a heater(s) in order to heat the hop-mixed liquid and/or the solvent.

For example, in the apparatus according to the present invention, the heater(s) for heating the hop-mixed liquid may be attached to any location(s) on the tank and/or the circulation line. The heater for heating the solvent may be attached to any location on the solvent supplying line. In the apparatus according to the present invention, the location, to which the heater is attached, is not particularly limited to the above-described locations. Type of the heater comprises, but is not particularly limited to, for example, a plate type heater, a shell and tube type heater, a jacket type heater, a coil type heater, etc.

More specifically, as shown in the apparatus 10 according to the first embodiment illustrated in FIG. 1, for example, a plate type heater 4a and/or a shell and tube type heater (not shown) may be attached to any location(s) on the circulation line 2 to heat the hop-mixed liquid running through the circulation line 2.

Figure 2:
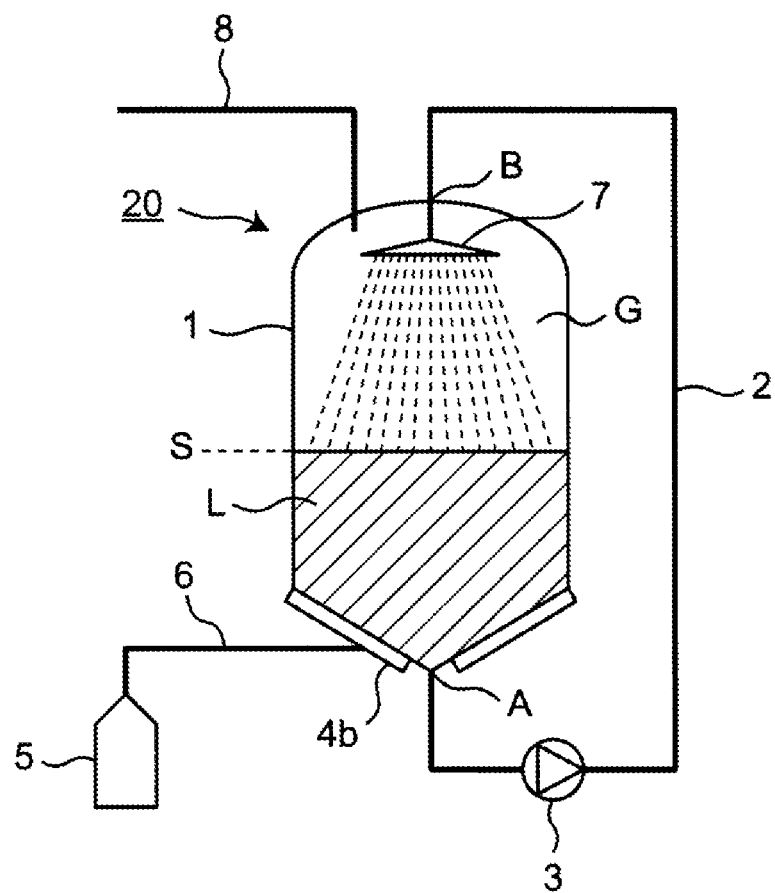
FIG. 2 is a schematic view of an apparatus according to the second embodiment of the present invention.

As shown in the apparatus 20 according to the second embodiment illustrated in FIG. 2, for example, a jacket type heater 4b may be attached to any location of the tank 1, preferably to the bottom of the tank to heat the hop-mixed liquid L which may be accommodated in the tank 1.

Figure 4:
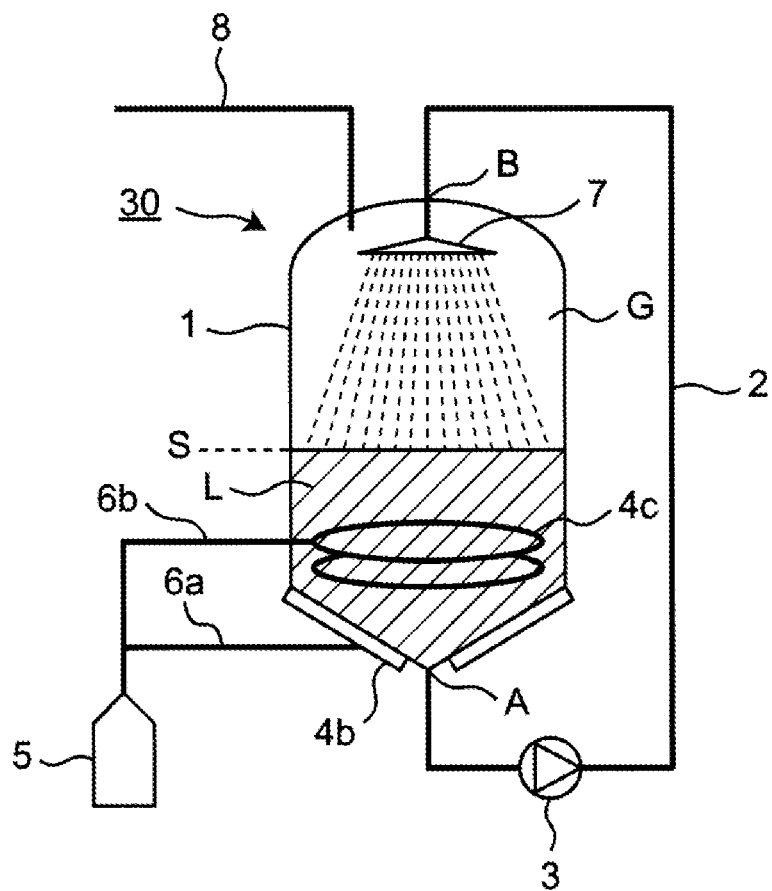
FIG. 4 is a schematic view of an apparatus according to the third embodiment of the present invention.

As shown in the apparatus 30 according to the third embodiment illustrated in FIG. 4, a coil type heater 4c may be additionally employed as a heater. Herein, such coil type heater 4c may be used together with the heater 4b as illustrated in the figure, or may be used alone.

In these embodiments, for example, a fluid such as water vapor and hot water can be supplied from a heat source 5 to a heater 4 (specifically, 4a, 4b, 4c, or the like) through the heat supplying line 6 (or 6a or 6b). Thereby, the temperature of the hop-mixed liquid L can be appropriately controlled. Alternatively, an electrical heater, a heat exchanger, or the like, may be employed as the heater 4.

In the apparatus according to the present invention, the above-described heater may be attached to the solvent supplying line 8. The temperature of the hop-mixed liquid can be appropriately controlled during the preparation of the hop-mixed liquid or the adjustment of the concentration of the liquid.

In the present invention, if the temperature of the hop-mixed liquid or the solvent can be maintained at a desired temperature, the heater may be absent. In that case, it is preferable to maintain the temperature of the hop-mixed liquid by using a heat insulating material, and the like.

In the apparatus according to the present invention, for example, as shown in FIG. 1, at least a part of the hop-mixed liquid L can be continuously or successively supplied to the empty portion G of the tank 1 through the circulation line 2.

The method for supplying the hop-mixed liquid L to the empty portion G is not particularly limited. For example, as shown in FIG. 1, a spreader 7 can be attached to the exit of the circulation line 2 to supply the hop-mixed liquid L to the empty portion G of the tank 1, preferably as a film (or a curtain) or a mist.

Figure 3:
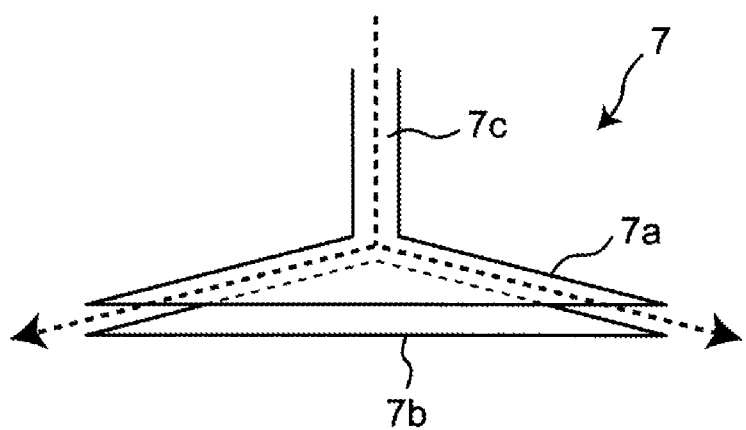
FIG. 3 is an enlarged schematic view of a spreader.

As the spreader 7, for example, as specifically shown in the enlarged view of FIG. 3, a conical spreader may be employed, which can be assembled by stacking two cone parts 7a and 7b, each of which parts is in a parasol shape or a lamp shade shape. According to such conical spreader, the hop-mixed liquid can be introduced through the conduit 7c attached to the upper corn part 7a, wherein the conduit 7c is connected to the circulation line 2. Subsequently, the hop-mixed liquid can be supplied to the empty portion G of the tank 1 through the gap (or clearance) provided between those two corn parts 7a and 7b.

Figure 5:
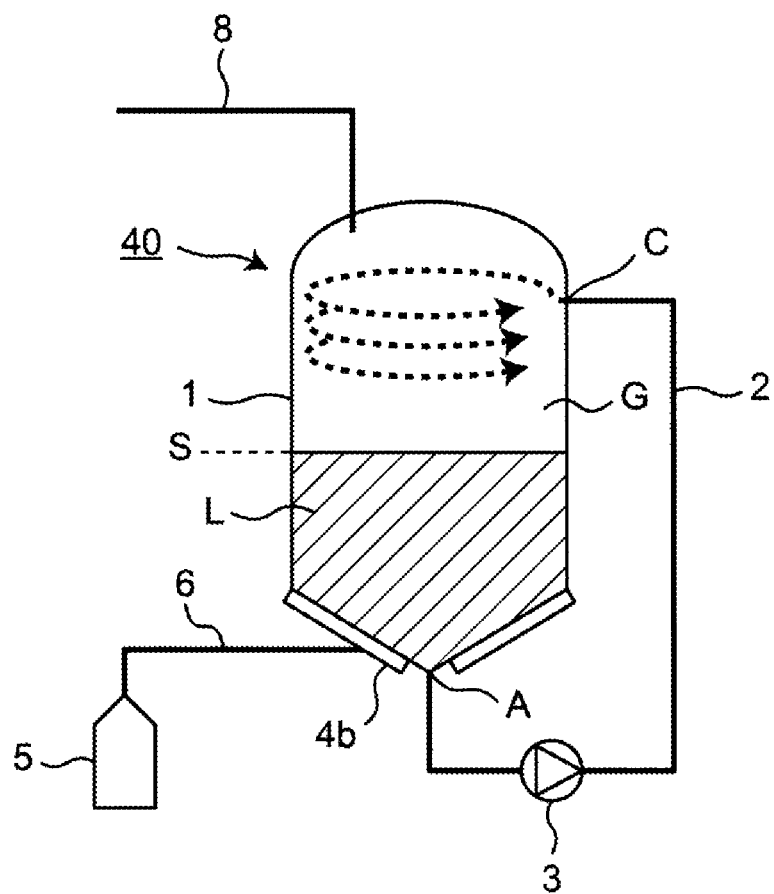
FIG. 5 is a schematic view of an apparatus according to the fourth embodiment of the present invention.
Figure 6:
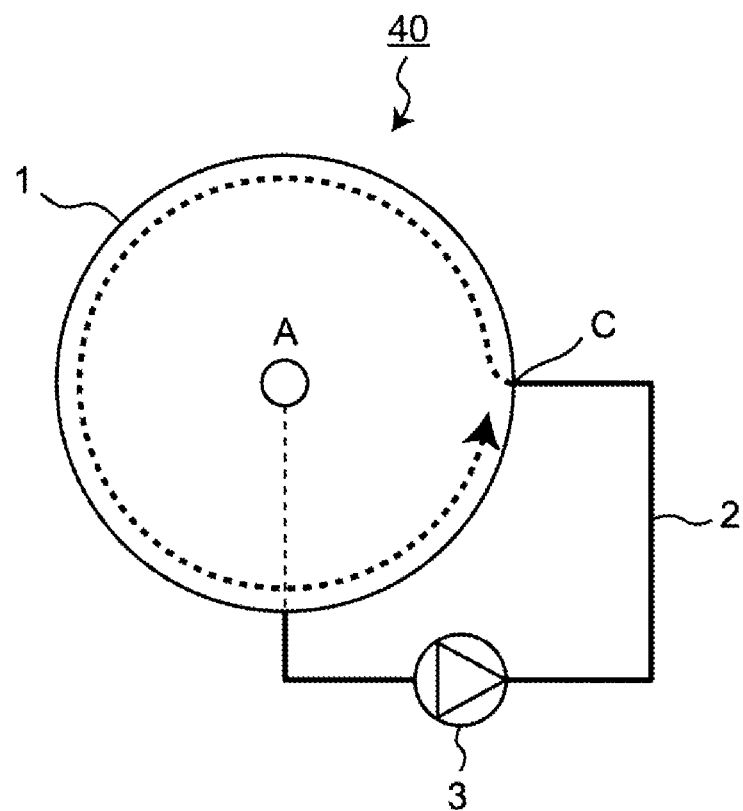
FIG. 6 is a schematic view of an apparatus according to the fourth embodiment of the present invention, which shows an overhead cross section.

Alternatively, as shown in the apparatus 40 according to the fourth embodiment illustrated in the FIGS. 5 and 6, for example, an inlet C can be placed at any location on the side of the tank 1 and upper than the liquid surface S. Through the inlet C, the hop-mixed liquid can be supplied from the circulation line 2 in a direction generally parallel to the liquid surface S, preferably in a direction along the tangent line to the cross sectional circle of the tank 1. Upon supplying the hop-mixed liquid L to the empty portion G in this manner, the hop-mixed liquid L can be downwardly flowed with turning along the inner wall surface of the tank 1 as a film.

Herein, the supply of the hop-mixed liquid L to the empty portion G of the tank is not limited to the method described above. For example, in the tank, a supplying means such as a shower ball can be attached to the exit of the circulation line 2. Thereby, the hop-mixed liquid can be supplied to the empty portion of the tank.

Thus, in the apparatus according to the present invention, the hop-mixed liquid can be supplied to the empty portion of the tank through the circulation line to remarkably reduce the amount of the raw hop odor component(s) contained in the hop-mixed liquid. Herein, the amount of the desired "hop aroma component(s)" derived from the hop is not substantially reduced.

In addition, the apparatus according to the present invention may comprise an exhaust port. Thereby, the pressure in the tank can be appropriately controlled. It is preferable that the exhaust port is placed such that the port communicates to the empty portion of the tank. The exhaust port (not shown) is preferably placed at the top of the tank, particularly at or near the center of the top of the tank. Herein, such exhaust port may be an atmosphere open type, or may be attached to any deodorizing apparatus, etc.

In the descriptions above, the apparatuses according to the present invention are briefly summarized with referring to the apparatuses according to the embodiments 1 to 4. The apparatuses according to the embodiments 1 to 4 are described below in detail.

The apparatus 10 according to the first embodiment illustrated in FIG. 1 comprises a plate type heater 4a, as a heater, which may be provided on the circulation line 2. A fluid such as water vapor and hot water is supplied to the plate type heater 4a, preferably from a heat source 5, through a heat supplying line 6 (fluid temperature: for example, from 40° C. to 130° C., preferably from 50° C. to 130° C., more preferably from 60° C. to 130° C., yet more preferably from 80° C. to 130° C., particularly preferably from 90° C. to 130° C.), and the temperature of the hop-mixed liquid running through the circulation line 2 can be appropriately controlled (hop-mixed liquid temperature: for example, from 40° C. to 99° C., preferably from 50° C. to 99° C., more preferably from 60° C. to 99° C., yet more preferably from 80° C. to 99° C., particularly preferably from 90° C. to 99° C.). In the tank 1, the spreader 7 is placed at the exit of the circulation line 2, wherein the circulation line 2 is desirably placed between the outlet A provided at the center of the bottom of the tank 1 and the inlet B provided at the center of the top of the tank 1, and the circulation line 2 is configured so that the hop-mixed liquid L can be subjected to a circulation through the tank 1 via an optional pump 3.

The apparatus 20 according to the second embodiment illustrated in FIG. 2 comprises a jacket type heater 4b, as a heater, which may be desirably provided at the bottom of the tank 1. A fluid such as water vapor and hot water is supplied to the jacket type heater 4b, preferably from the heat source 5, through the heat supplying line 6 (fluid temperature: for example, from 40° C. to 130° C., preferably from 50° C. to 130° C., more preferably from 60° C. to 130° C., yet more preferably from 80° C. to 130° C., particularly preferably from 90° C. to 130° C.), and the temperature of the hop-mixed liquid L can be appropriately controlled in the tank 1 (hop-mixed liquid temperature: for example, from 40° C. to 99° C., preferably from 50° C. to 99° C., more preferably from 60° C. to 99° C., yet more preferably from 80° C. to 99° C., particularly preferably from 90° C. to 99° C.). In the tank 1, the spreader 7 is placed at the exit of the circulation line 2, wherein the circulation line 2 is desirably placed between the outlet A provided at the center of the bottom of the tank 1 and the inlet B provided at the center of the top of the tank 1, and the circulation line 2 is configured so that the hop-mixed liquid L can be subjected to a circulation through the tank 1 via an optional pump 3.

The apparatus 30 according to the third embodiment illustrated in FIG. 4 is similar to the apparatus according to the second embodiment described above with the proviso that a coil type heater 4c is employed in addition to the jacket type heater 4b.

Moreover, the apparatus 40 according to the fourth embodiment illustrated in FIG. 5 is similar to the apparatus according to the second embodiment described above with the proviso that the spreader 7 is absent, and the exit of the circulation line 2 is connected to the inlet C placed at the side of the tank 1, and this apparatus is configured so that the hop-mixed liquid can be supplied along the internal wall of the tank 1.

Each of the above-described apparatuses according to the first to fourth embodiments has an exhaust port (not shown), which can communicate to the empty portion G, around the top of the tank 1.

Herein, the apparatus according to the present invention should not be interpreted as limited to the above-described embodiments 1 to 4. In the apparatuses according to the embodiments 1 to 4 described above, the same letters or numerals shown in the figures appended herewith mean the same member or part.

Followingly, the production method for a beer or a beer-like beverage according to the present invention is described in detail.

<Production Method>

The production method according to the present invention relates to a method for producing a beer or a beer-like beverage, which is characterized in that at least a part of the hop-mixed liquid is withdrawn from the tank, and the liquid is supplied to the empty portion of the tank, again, and thereby, the hop-mixed liquid is circulated through the tank.

Herein, the present production method is characterized in that the hop-mixed liquid is maintained in a tank at a temperature less than the boiling point of the solvent contained in the hop-mixed liquid.

According to the present production method, at the temperature less than the boiling point of the solvent contained in the hop-mixed liquid, without the hop-mixed liquid being boiled, i.e., under non-boiling conditions, the hop-mixed liquid is subjected to the circulation through the tank, and thereby, the hop-mixed liquid can be supplied to the empty portion of the tank, while the hop-mixed liquid is maintained in the tank. Thereby, the amount of the "raw hop odor component" derived from the hop contained in the hop-mixed liquid can be remarkably reduced. Herein, according to the present invention, the amount of the desired "hop aroma component" derived from the hop is not substantially reduced. As a result, the production of a beer or a beer-like beverage utilizing the production method according to the present invention can provide a beer or a beer-like beverage having a pure and mild, unprecedented and excellent hop aroma having a slight raw hop odor.

Hereinafter, each of the terms used for the present invention is described in detail.

The "hop" means Cannabaceae perennial plant (Latin name: *Humulus lupulus*), which can be used for producing a beer or a beer-like beverage (hereinafter, which may be abbreviated as "beer"). The hop includes, but is not particularly limited to, for example, Brewers Gold, Cascade, Chinook, Cluster, Fuggles, Mount Hood, Northern Brewer, Nugget, Perle, Saaz, Saphir, Tettnanger, Willamette, etc. A single hop can be used alone, or two or more of hops can be used in any combination. In the present invention, the embodiment of the hop includes, but is not particularly limited to, for example, a form as a pellet, a powder, an extract, a strobilus (including its compressed form), etc. A single embodiment thereof can be employed alone, or two or more of embodiments thereof can be employed in any combination.

The "hop aroma component" means a component which can provide a flower-like odor or a fruit-like odor among the odorants which can be contained in the hop, which may be expressed as a "floral" or "fruity" odor, etc. For example, the "hop aroma component" comprises linalool, geraniol, etc. In the present invention, the "hop aroma component" primarily means "linalool", but it should not be interpreted as limited to linalool.

The "raw hop odor component" means a component which can provide a raw hop-like greenly odor or a resin-like odor (e.g., wax-like odor) among the odorants which can be contained in the hop. For example, the "raw hop odor component" comprises myrcene, humulene, etc. In the present invention, the "raw hop odor component" primarily means "myrcene", but it should not be interpreted as limited to myrcene.

Herein, the wording "odorants which can be contained in the hop" used in the present invention comprises both of the "hop aroma component" and the "raw hop odor component", and it is meant that the wording may further include other odorants in addition to the above-described components.

The "hop aroma" means an order derived from the above-described hop aroma component principally. More specifically, the "hop aroma" means an odor like a flower or a fruit, or an order which can be expressed as "floral" and/or "fruity" odor, etc.

The wording of the "amount of the hop aroma component is not substantially reduced" means that the residual rate of the hop aroma component in the hop-mixed liquid is in a range of, for example, 70% or more, preferably 80% or more, more preferably 90% or more, after the treatment according to the present invention (or after more than 5 minutes from the start of the treatment, and, for example, before or at 30 minutes, preferably before or at 60 minutes, more preferably before or at 90 minutes). Herein, the wording of the "residual rate of the hop aroma component in the hop-mixed liquid" means a value represented in a percentage (%) of the content of the hop aroma component in the hop-mixed liquid after the treatment, as a basis of the weight, relative to the content of the hop aroma component in the hop-mixed liquid, as a basis of the weight, which is measured at the start of the treatment (e.g., within 5 minutes after the start).

The wording of the "amount of the raw hop odor component is remarkably (or significantly) reduced" means that the residual rate of the raw hop odor component in the hop-mixed liquid is in a range of, for example, 70% or less, preferably 60% or less, more preferably 50% or less, yet more preferably 40% or less, after the treatment according to the present invention (or after more than 5 minutes from the start of the treatment, and, for example, at and after 90 minutes, preferably at and after 60 minutes, more preferably at and after 30 minutes). Herein, the wording of the "residual rate of the raw hop odor component in the hop-mixed liquid" means a value represented in a percentage (%) of the content of the raw hop odor component in the hop-mixed liquid after the treatment, as a basis of the weight, relative to the content of the raw hop odor component in the hop-mixed liquid, as a basis of the weight, which is measured at the start of the treatment (e.g., within 5 minutes after the start).

The wording of the "pure and mild hop aroma having a slight raw hop odor" means a natural, gentle, pure, floral and/or fruity odor obtained by remarkably reducing the odor derived from the above-described raw hop odor component and relatively increasing the odor derived from the hop aroma component.

The term "hop-mixed liquid" means a liquid which contains the above-described hop and a solvent. The embodiment thereof is not particularly limited, and may be a dispersion, a suspension, or a solution.

The term "solvent" means, but is not particularly limited to, a liquid allowing at least a part of the odorant(s) which can be contained in the hop to be dissolved (herein, which may be abbreviated as a "dissolution liquid"). The solvent comprises, for example, water; a liquid wherein at least one of additives selected from the group consisting of acids, alkalis, salts, flavoring agents, acidulants, emulsifying agents, sweetening agents, bittering agents, saccharides, sugar syrups, starches, dietary fibers, food colors, coloring agents, barley extracts, malt extracts and yeast extracts is added to water; or a juice derived from at least one of plant materials selected from the group consisting of grains (e.g., wheat varieties, rice varieties, corns), beans (e.g., soybeans, peas), potatoes (e.g., sweet potatoes, *solanum tuberosum*) and sugarcanes (e.g., *saccharum officinarum*) (hereinafter, which may be abbreviated to as a "raw juice"), etc.

Herein, the additive which may be contained in the above-described liquid comprises, but is not particularly limited to, for example, an additive which is allowed to be added to food or beverages, particularly beers.

The above-described plant material may be a germinated material or non-germinated material. The germinated and non-germinated materials may be mixed and used together. In the present invention, it should not be interpreted that the plant material is limited to the above-described materials.

Among the juices derived from the above-described plant materials, juices derived from wheat varieties are preferable as a juice derived from the grain. The wheat varieties comprise, for example, barley, wheat, rye, oat (or wild oat), etc. Barley and wheat are preferable. Among others, barley malt and wheat malt are preferable. A wort obtained from barley malt, wheat malt, or the like is preferable as a juice derived from the wheat variety.

Similarly to the above-described liquid, the juices derived from the plant materials may further comprise at least one of additives selected from the group consisting of acids, alkalis, salts, flavoring agents, acidulants, emulsifying agents, sweetening agents, bittering agents, saccharides, sugar syrups, starches, dietary fibers, food colors, coloring agents, barley extracts, malt extracts and yeast extracts, etc.

According to the present invention, water; and a liquid wherein at least one of additives selected from the group consisting of acids, alkalis, salts, flavoring agents, acidulants, emulsifying agents, sweetening agents, bittering agents, saccharides, sugar syrups, starches, dietary fibers, food colors, coloring agents, barley extracts, malt extracts and yeast extracts is added to water are preferable based on the aspect of the dissolution of the odorant contained in the hop thereto, etc. Particularly, the followings are preferably employed:

(1) water (2) a liquid wherein at least one of additives selected from the group consisting of acids, alkalis and salts is added to water, and (3) a liquid wherein at least one of additives selected from the group consisting of acids, alkalis, salts, flavoring agents, acidulants, emulsifying agents, sweetening agents, bittering agents, saccharides, sugar syrups, starches, dietary fibers, food colors and coloring agents is added to the water.

Regarding the hop-mixed liquid, the proportion of the hop to the solvent (hop/solvent) is not particularly limited to, but, for example, 15000 ppm or less, preferably 10000 ppm or less, more preferably 5000 ppm or less, as a basis of the weight, with the proviso that the case of 0 ppm is excluded. In the case of that the proportion of the hop is more than 15000 ppm, the flowability of the hop-mixed liquid may be decreased, and it may give a problem on the circulation of the hop-mixed liquid. Therefore, in the case of that the proportion of the hop is 15000 ppm or less, the hop-mixed liquid can be successfully circulated.

With the proportion of the hop to the solvent (hop/solvent) being 15000 ppm or less, the raw hop odor component(s) can be effectively reduced.

According to the present invention, upon calculating the proportion of the hop to the solvent (hop/solvent), a calculated value based on the proportion of α (alpha) acids contained in the hop as the total amount (hereinafter, which is referred to as "calculated value based on α (alpha) acids") is used as the weight of the hop. For example, in the case of that alpha acids are contained in a hop wherein the proportion of the alpha acids is 10 wt %, 100 g of the hop contains 10 g of alpha acids, and therefore, the calculation on the weight of the hop based on the alpha acids according to the present invention results in 10 g of the calculated value based on alpha acids. Herein, as the weight of the solvent, if the solvent contains the additive(s) or the like, the value of the total weight of the liquid containing such additive(s) is used.

Herein, the types of the alpha acids contained in the hop are not particularly limited. The alpha acids contained in the hop include, for example, humulone, adhumulone, cohumulone, posthumulone, prehumulone, etc. The proportion of the alpha acids contained in the hop is, but not particularly limited to, for example, within a range from 1 wt % to 60 wt %. In the case of that the hop is used in a solid state such as a hop pellet, the proportion of the alpha acids contained in the hop is, for example, within a range from 1 wt % to 20 wt %. In the case of that the hop is used in a liquid state such as a hop extract, the proportion of the alpha acids contained in the hop is, for example, within a range from 20 wt % to 60 wt %.

pH of the hop-mixed liquid is, but not particularly limited to, for example, 8.0 or less, preferably 7.0 or less, more preferably 6.0 or less, and yet more preferably within a range from 5.0 to 6.0. By controlling pH of the hop-mixed liquid at 8.0 or less, a more natural hop odor can be obtained for a beer or a beer-like beverage. Herein, the term "more natural hop odor" means that an unpleasant feeling or a discomfort feeling derived from a bad smell, which may be generated after the denaturation of the component contained in the hop, is substantially absent.

For example, as illustrated in FIGS. 1, 2, 4 and 5, the present production method is characterized in that the hop-mixed liquid L is accommodated in the tank 1, or the hop-mixed liquid L is prepared in the tank 1, and at least a part of the hop-mixed liquid L is withdrawn from the tank 1, and the hop-mixed liquid L is supplied to the empty portion G of the tank 1, again, and thereby, the hop-mixed liquid L is circulated through the tank 1. Moreover, the present production method is characterized in that, in the tank, the hop-mixed liquid L is maintained at a temperature less than the boiling point of the solvent contained therein.

The temperature of the hop-mixed liquid maintained in the tank is, for example, from 40° C. to a temperature less than the boiling point of the solvent, preferably from 50° C. to a temperature less than the boiling point of the solvent, more preferably from 60° C. to a temperature less than the boiling point of the solvent, yet more preferably from 80° C. to a temperature less than the boiling point of the solvent, and particularly preferably from 90° C. to a temperature less than the boiling point of the solvent. For example, at atmospheric pressure, the temperature is within a range from 40° C. to 99.9° C., preferably within a range from 50° C. to 99.9° C., more preferably within a range from 60° C. to 99.9° C., yet more preferably within a range from 80° C. to 99.9° C., and particularly preferably within a range from 90° C. to 99.9° C. In the case of that the temperature of the hop-mixed liquid is 50° C. or more, the solidification of the resin(s) contained in the hop can be remarkably reduced, and the reduced flowability of the hop-mixed liquid and the clogging of the pipe(s) can be significantly prevented. In the case of that the temperature of the hop-mixed liquid is 60° C. or more, the decrease of the raw hop odor component becomes more significant with the amount of the hop aroma component being maintained. In the case of that the temperature of the hop-mixed liquid is 80° C. or more, the decrease of the raw hop odor component becomes more significant. In the case of that the temperature of the hop-mixed liquid is 90° C. or more, the treating period can be remarkably shortened.

According to the present invention, the maintenance of the hop-mixed liquid in the tank at such temperature allows the raw hop odor component to be decreased in a short period. Particularly, the increase of the temperature can enhance the advantage. In that case, by maintaining the non-boiling conditions, the amount of the hop aroma component cannot be substantially reduced.

According to the present invention, it is important that the hop-mixed liquid, particularly solvent contained therein, is under non-boiling conditions. The pressure in the tank can be appropriately determined so that the solvent is under the non-boiling conditions depending on the temperature of the hop-mixed liquid. Herein, as long as the non-boiling conditions of the solvent can be kept, the pressure in the tank is, but not particularly limited to, for example, 0.05 MPa or less, preferably 0.02 MPa or less, and more preferably 0.01 MPa or less, as a gage pressure (which is a pressure calculated by subtracting the atmospheric pressure from the absolute pressure).

The circulating rate of the hop-mixed liquid is, for example, no less than 0.1 cycle/min, preferably no less than 0.5 cycle/min, more preferably no less than 1 cycle/min.

Herein, the circulating rate of the hop-mixed liquid is meant as the cycle count over 1 minute wherein the hop-mixed liquid L is withdrawn from the tank and returned to the inside of the tank, again, through the circulation line 2. For example, when the amount of the hop-mixed liquid L is 2000 L and the liquid is transferred at a rate of 1000 L/min, the above-described circulating rate is 0.5 cycle/min.

Herein, upon circulating the hop-mixed liquid, as long as at least a part of the hop-mixed liquid can be accommodated in the tank, the height of the liquid surface S is not particularly limited. Therefore, the volumes of the empty portion G and the hop-mixed liquid L are optional, respectively, and have no particular limitation.

According to the present invention, the method for supplying the hop-mixed liquid L to the empty portion G of the tank 1 is not particularly limited. For example, as illustrated in FIG. 3, a spreader 7 (preferably a conical spreader) may be employed to supply the hop-mixed liquid from the spreader 7 to the empty portion G of the tank 1 as a film (or a curtain).

For example, as illustrated in FIGS. 5 and 6, the hop-mixed liquid L may be supplied from the inlet C in a direction generally parallel to the liquid surface S of the hop-mixed liquid L, preferably in a direction along the tangent line to the cross sectional circle of the tank 1, from the circulation line 2. Thereby, the hop-mixed liquid may be supplied to the empty portion G of the tank 1. Such supplying method can downwardly flow the hop-mixed liquid with turning, as a film, along the inner wall surface of the tank 1.

Alternatively, in the empty portion inside the tank, for example, a supplying equipment such as a shower ball may be placed at the exit of the circulation line 2 to scatter or spray the hop-mixed liquid to the empty portion of the tank.

Thus, according to the present invention, it is preferable that the hop-mixed liquid L is supplied to the empty portion G of the tank 1 through the circulation line 2. Thereby, among the odorants contained in the hop, the raw hop odor component can be predominantly reduced in relation to the above-described temperature of the hop-mixed liquid.

As mentioned above, according to the present invention, the supply of the hop-mixed liquid L to the empty portion G of the tank by the circulation can prevent from occurring the generation of bubbles on the liquid surface S. Therefore, according to the present method, there is no need to remove such bubbles, and therefore, the present method can be simplified. The mechanisms necessary for removing the bubbles, and the like, are not required. Moreover, the volume of the empty portion of the tank, which may be occupied by the bubbles, can be minimized. As a result, the apparatus according to the present invention can be simplified or downsized.

Herein, for the present invention, the volume of the tank, the throughput of the hop-mixed liquid, the treatment time, and the like, are not particularly limited.

As described above, according to the present production method, while the hop-mixed liquid is maintained in the tank at a temperature less than the boiling point of the solvent, the hop-mixed liquid is circulated. Thereby, in the hop-mixed liquid, the amount of the undesired raw hop odor component can be remarkably reduced without the amount of the desired hop aroma component derived from the hop being substantially reduced. As a result, such production method can be applied to a production of a beer or a beer-like beverage, and thereby, a pure and mild hop aroma having a slight raw hop odor can be added to a beer or a beer-like beverage.

Subsequently, the beer or the beer-like beverage obtained/obtainable by the present production method is described.
<Beer or Beer-Like Beverage>

The hop-mixed liquid after the treatment, which is obtained/obtainable according to the above-described production method, can be employed in any step(s) of a producing process for a beer or a beer-like beverage (hereinafter, which may be abbreviated as a "beer"), and thereby, a pure and mild hop aroma having a slight raw hop odor can be added to the beer.

Particularly, it is preferable that the hop-mixed liquid after the treatment is added in any appropriate amount, at an appropriate timing, in any step(s) after boiling the wort in the production process for the beer.

Herein, the above-described treatment of the hop-mixed liquid can be separately carried out, by using the above-described apparatus, for example, form the boiling process of the wort for producing the beer.

The present inventions are further described in detail with referring to the following examples, but the present inventions are not limited to the following examples.

EXAMPLES

Example 1

Using an apparatus 10 having a spreader 7 shown in FIG. 1 (see FIG. 3 for further details), a hop-mixed liquid was subjected to a circulating treatment for 90 minutes under the following conditions.

Among the odorants contained in the hop-mixed liquid, the amounts of linalool as a hop aroma component and myrcene as a raw hop odor component were measured, respectively. The contents of linalool and myrcene in the hop-mixed liquid were measured with a gas chromatography-mass spectrometry (GC-MS) apparatus. The results are shown in the following Table 1 and the graph of FIG. 8.
  Producing Apparatus
  tank: volume 3500 L
  heater: plate type heater (attached to circulation line)
  heat source: water vapor (130° C.)
  pump: 1000 L/min of supplying rate
  circulating rate: 0.8 cycle/min
  circulation line: this line is attached between the outlet at the center of the bottom of the tank and the inlet at the center of the top of the tank
  spreader: conical spreader (supplying amount: 1000 L/min)
  empty portion: air
  pressure in tank: atmospheric pressure
  Hop-Mixed Liquid
  hop: 23 kg of pellet (calculated value based on α (alpha) acids: 2.0 kg)
  solvent: water (1300 L)
  mixing ratio (hop/solvent): about 1500 ppm
  temperature of hop-mixed liquid: 91° C. to 96° C.
  pH of hop-mixed liquid: about 5 to about 6

TABLE 1

| | Example 1 | | | |
| --- | --- | --- | --- | --- |
| | Treatment Time (minute) | | | |
| | 3 | 30 | 60 | 90 |
| Linalool (ppb) | 880 | 940 | 850 | 740 |
| Myrcene (ppb) | 2500 | 1170 | 390 | 130 |

Figure 8:
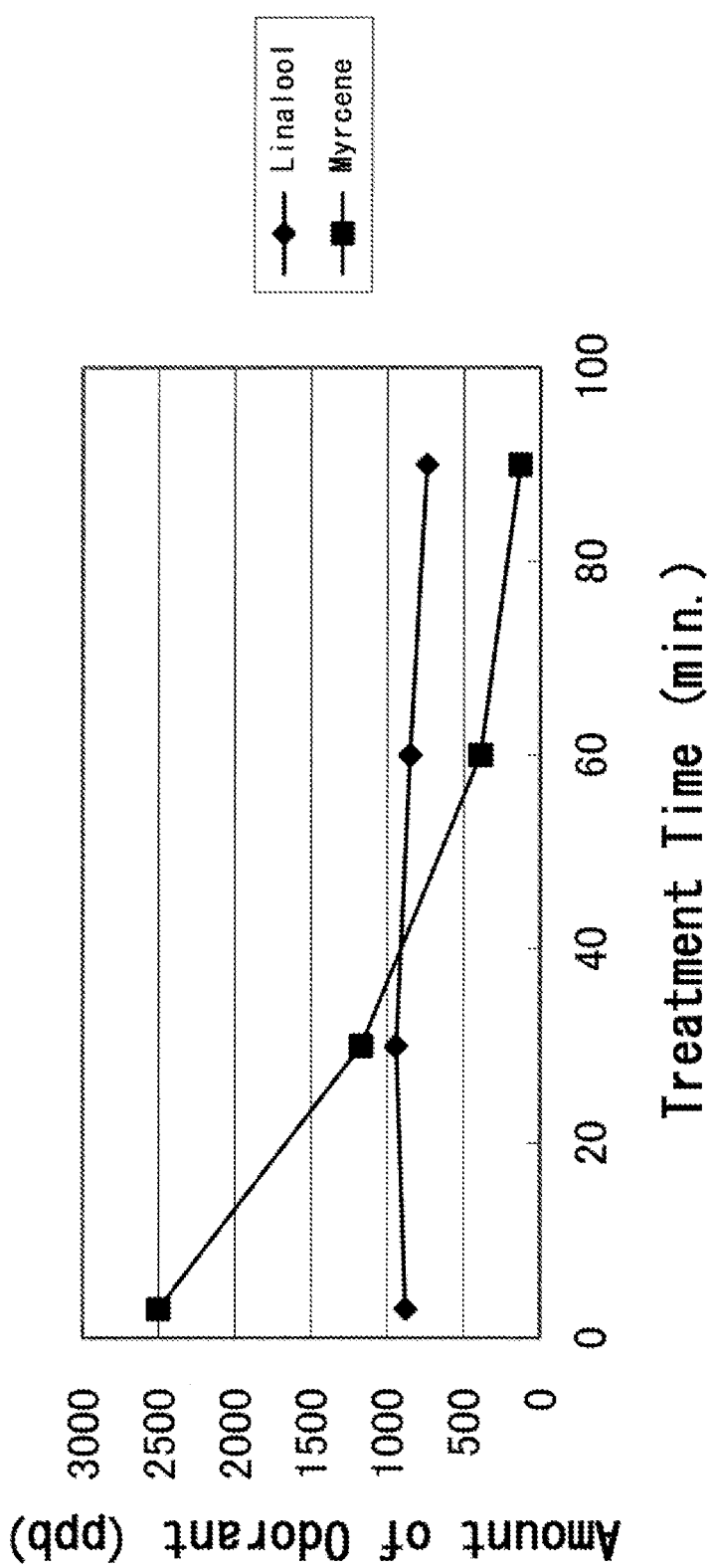
FIG. 8 is a graph showing the results in Example 1 of the present invention.

As shown in Table 1 and the graph of FIG. 8, the amount of the linalool as the hop aroma component was not substantially reduced (residual rate at 90 minutes=84.1%). Whereas, the amount of the myrcene as the raw hop odor component was remarkably reduced (residual rate at 90 minutes=5.2%).

Comparative Example 1

Figure 7:
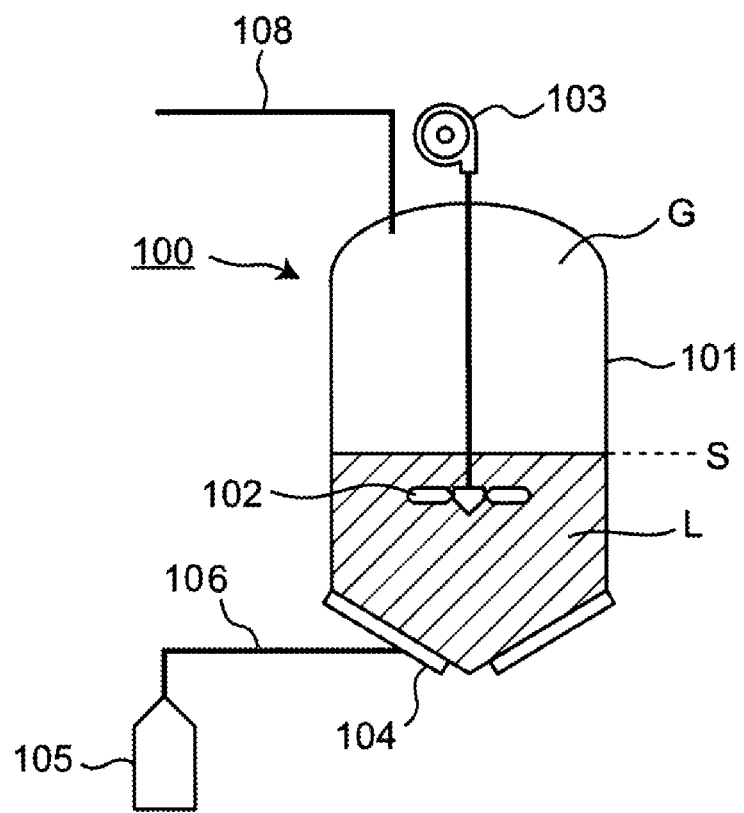
FIG. 7 is a schematic view of an apparatus employed in Comparative Example 1 or 3.

Using an apparatus 100 shown in FIG. 7, which has no circulating ability, the hop-mixed liquid was subjected to the mixing treatment for 90 minutes under the following conditions.

In the similar procedure to that of Example 1, among the odorants contained in the hop-mixed liquid, the amounts of linalool as a hop aroma component and myrcene as a raw hop odor component were measured, respectively. The results are shown in the following Table 2 and the graph of FIG. 9.
  Producing Apparatus
  tank: volume 500 L
  heater: jacket type heater (which is attached to the bottom of the tank)
  heat source: water vapor (130° C.)
  stirrer: mixing with a stirring blade (80 rpm)
  empty portion: air
  pressure in tank: atmospheric pressure
  Hop-Mixed Liquid
  hop: 14 kg of pellet (calculated value based on α (alpha) acids: 0.77 kg)
  solvent: water (175 L)
  mixing ratio (hop/solvent): about 4400 ppm
  temperature of hop-mixed liquid: 89° C. to 96° C.
  pH of hop-mixed liquid: about 5 to about 6

TABLE 2

| | Comparative Example 1 | | | |
| --- | --- | --- | --- | --- |
| | Treatment Time (minute) | | | |
| | 5 | 30 | 60 | 90 |
| Linalool (ppb) | 3090 | 2650 | 2680 | 2810 |
| Myrcene (ppb) | 6910 | 6280 | 4770 | 5920 |

Figure 9:
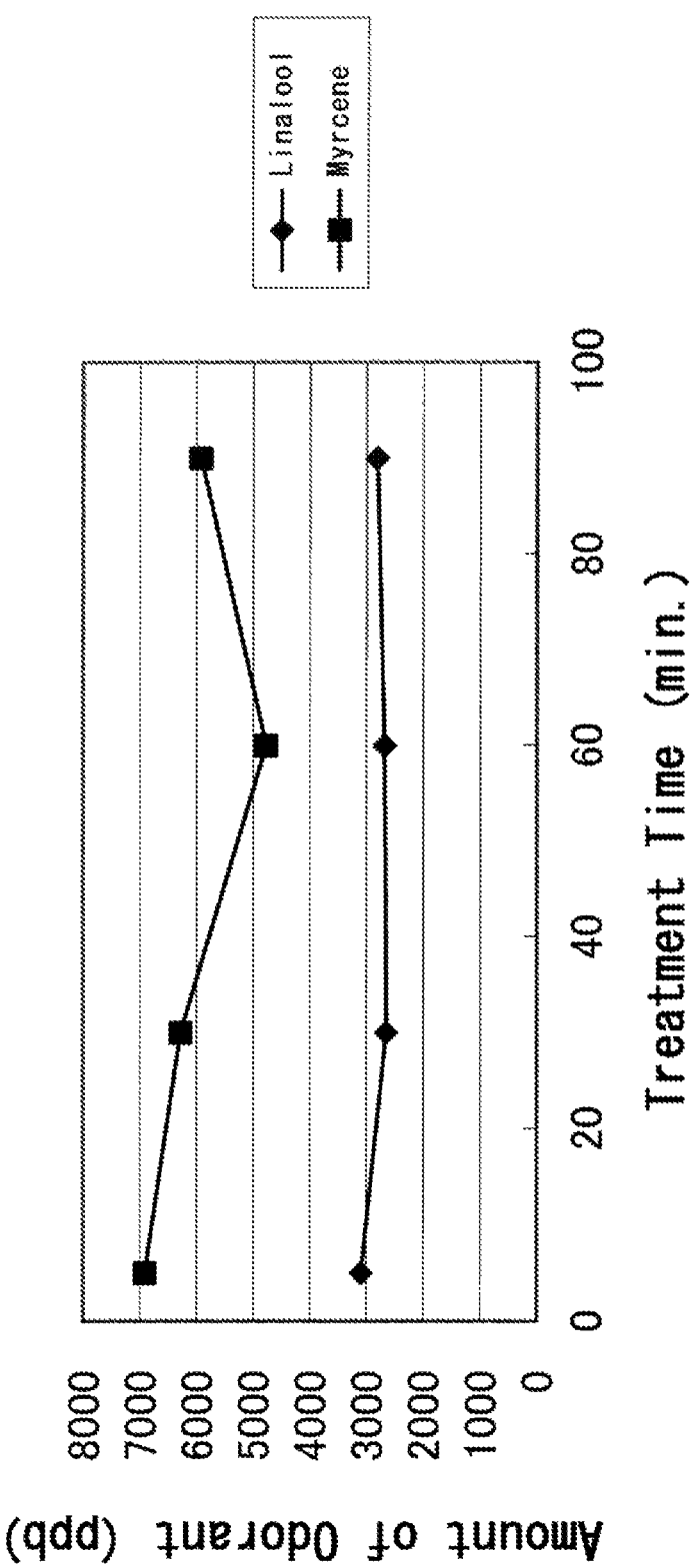
FIG. 9 is a graph showing the results in Comparative Example 1.

As shown in Table 2 and the graph of FIG. 9, according to Comparative Example 1, the amount of the linalool as the hop aroma component was almost unchanged (residual rate at 90 minutes=90.9%). The amount of the myrcene as the raw hop odor component was not remarkably reduced (residual rate at 90 minutes=85.7%).

Comparison of Example 1 with Comparative Example 1

As mentioned above, according to the method of Comparative Example 1, the amount of the myrcene as the raw hop odor component could not be remarkably reduced. Whereas, according to the method of Example 1 of the present invention, the amount of the myrcene as the raw hop odor component could be remarkably reduced, while the amount of the linalool as the hop aroma component was maintained.

Example 2

Using an apparatus 10 having a spreader 7 shown in FIG. 1 (see FIG. 3 for further details), the hop-mixed liquid was subjected to the circulating treatment for 60 minutes under the following conditions.

Producing Apparatus

The apparatus is the same to that of Example 1.

Hop-Mixed Liquid hop: 31 kg of pellet (calculated value based on α (alpha) acids: 2.6 kg)

solvent: water (1300 L)

mixing ratio (hop/solvent): about 2000 ppm temperature of hop-mixed liquid: 91° C. to 96° C.

pH of hop-mixed liquid: about 5 to about 6

Subsequently, the hop-mixed liquid was added to the wort after boiling, and then, beer yeast was added to the mixture, and subsequently, the mixture was fermented to give a beer beverage.

Figure 10:
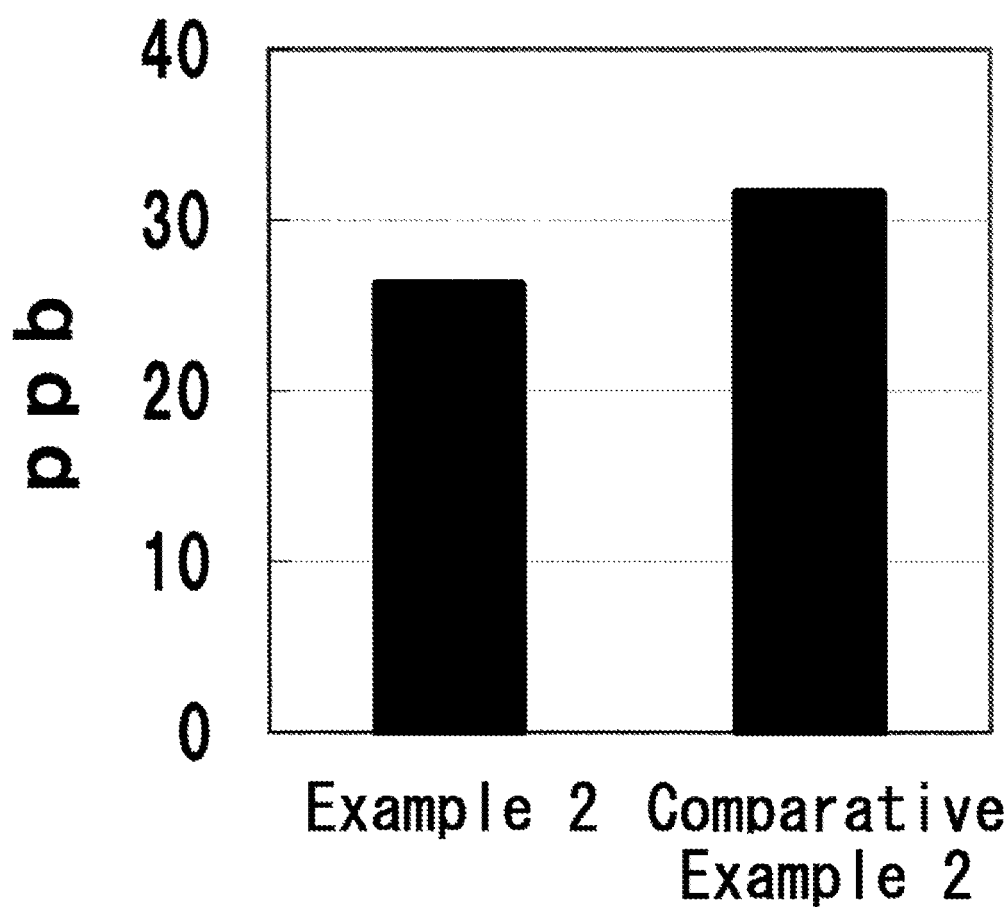
FIG. 10 is a graph showing the results of the comparison of Example 2 of the present invention with Comparative Example 2 (regarding linalool).
Figure 11:
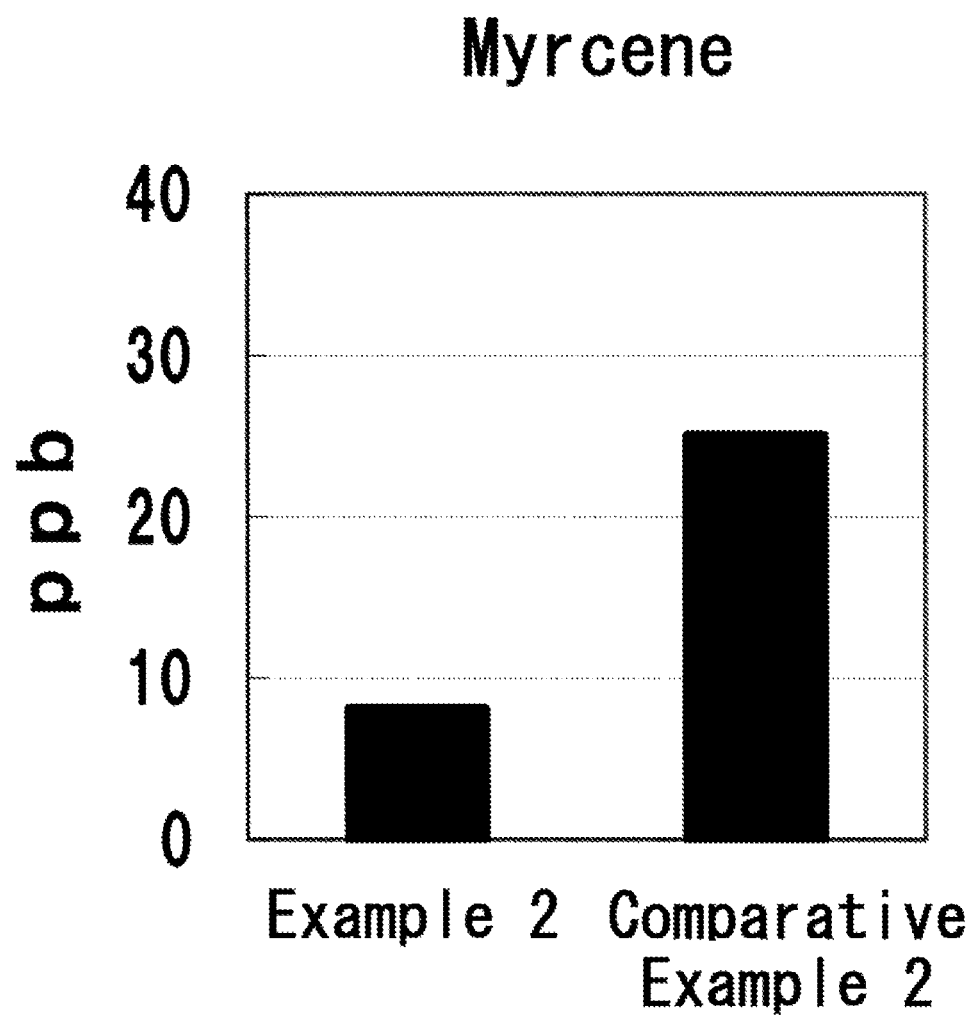
FIG. 11 is a graph showing the results of the comparison of Example 2 of the present invention with Comparative Example 2 (regarding myrcene).

The contents of linalool and myrcene in this beer beverage are shown in the graphs of FIGS. 10 and 11, respectively (linalool: 26 ppb, and myrcene: 8 ppb).

Comparative Example 2

Untreated hop was added to the wort after boiling, and then, beer yeast was added to the mixture, and subsequently, the mixture was fermented to give a beer beverage. The contents of linalool and myrcene in this beer beverage are shown in the graphs of FIGS. 10 and 11, respectively (linalool: 32 ppb, and myrcene: 25 ppb).

hop: this hop is the same to that of Example 2 (31 kg of pellet (calculated value based on α (alpha) acids: 2.6 kg))

Organoleptic Evaluation 1

An organoleptic evaluation was carried out, wherein seven (7) evaluators commented on the beer beverages of Example 2 and Comparative Example 2, respectively, according to the following criteria of the organoleptic evaluation. Multiple responses are accepted. The results are shown in the following Table 3.

Criteria of Organoleptic Evaluation

A: floral odor

B: fruity odor

C: raw hop-like greenly odor

D: resin-like odor

TABLE 3

| Criteria of Organoleptic Evaluation | Beer Beverage | |
|---|---|---|
| | Example 2 | Comparative Example 2 |
| A | 5 | 1 |
| B | 3 | 0 |
| C | 0 | 7 |
| D | 0 | 2 |

The findings based on the results of the organoleptic evaluation 1 are as follows. Regarding Comparative Example 2, the raw hop-like odor and the resin-like odor were intensively smelled. Whereas, regarding Example 2, a pure and mild hop aroma could be obtained, wherein the raw hop odor or the resin-like odor were reduced.

Thus, according to the present invention, the beer beverage having a natural, pure and mild, and superior hop aroma could be obtained.

Organoleptic Evaluation 2

Regarding the beer beverages of Example 2 and Comparative Example 2, the organoleptic evaluation was similarly carried out with the proviso that the number of the evaluators was altered to fifty seven (57). Non-response is accepted. The results are shown in the following Table 4.

TABLE 4

| Criteria of Organoleptic Evaluation | Beer Beverage | |
|---|---|---|
| | Example 2 | Comparative Example 2 |
| A | 19 | 8 |
| B | 7 | 6 |
| C | 13 | 27 |
| D | 3 | 8 |

The findings based on the results of the organoleptic evaluation 2 are as follows. Regarding Comparative Example 2, the raw hop-like odor and the resin-like odor were intensively smelled. Whereas, regarding Example 2, with the number of the evaluators being increased, the raw hop-like odor and the resin-like odor were reduced to give an order having an improved hop aroma, which is similar to that of the organoleptic evaluation 1 above.

Example 3

Using an apparatus 20 having a spreader 7 shown in FIG. 2 (see FIG. 3 for further details), the hop-mixed liquid was subjected to the circulating treatment for 90 minutes under the following conditions.

In the similar procedure to that of Example 1, among the odorants contained in the hop-mixed liquid, the amounts of the linalool as a hop aroma component and the myrcene as a raw hop odor component were measured, respectively. The results are shown in the following Table 5 and the graph of FIG. 12.

Producing Apparatus tank: volume 500 L heater: jacket type heater (which is attached to the bottom of the tank)

heat source: water vapor (130° C.)

pump: 65 L/min of supplying rate circulating rate: 0.4 cycle/min circulation line: this line is attached between the outlet at the center of the bottom of the tank and the inlet of the center of the top of the tank spreader: conical spreader (supplying amount: 65 L/min)

empty portion: air pressure in tank: atmospheric pressure

Hop-Mixed Liquid hop: 3.75 kg of pellet (calculated value based on α (alpha) acids: 0.375 kg)

solvent: water (150 L)

mixing ratio (hop/solvent): about 2500 ppm temperature of hop-mixed liquid: 88° C. to 99° C.

pH of hop-mixed liquid: about 5 to about 6

TABLE 5

Example 3

| | Treatment Time (minute) | | | |
|---|---|---|---|---|
| | 3 | 30 | 60 | 90 |
| Linalool (ppb) | 2373 | 2095 | 1943 | 1963 |
| Myrcene (ppb) | 3467 | 1903 | 769 | 450 |

Figure 12:
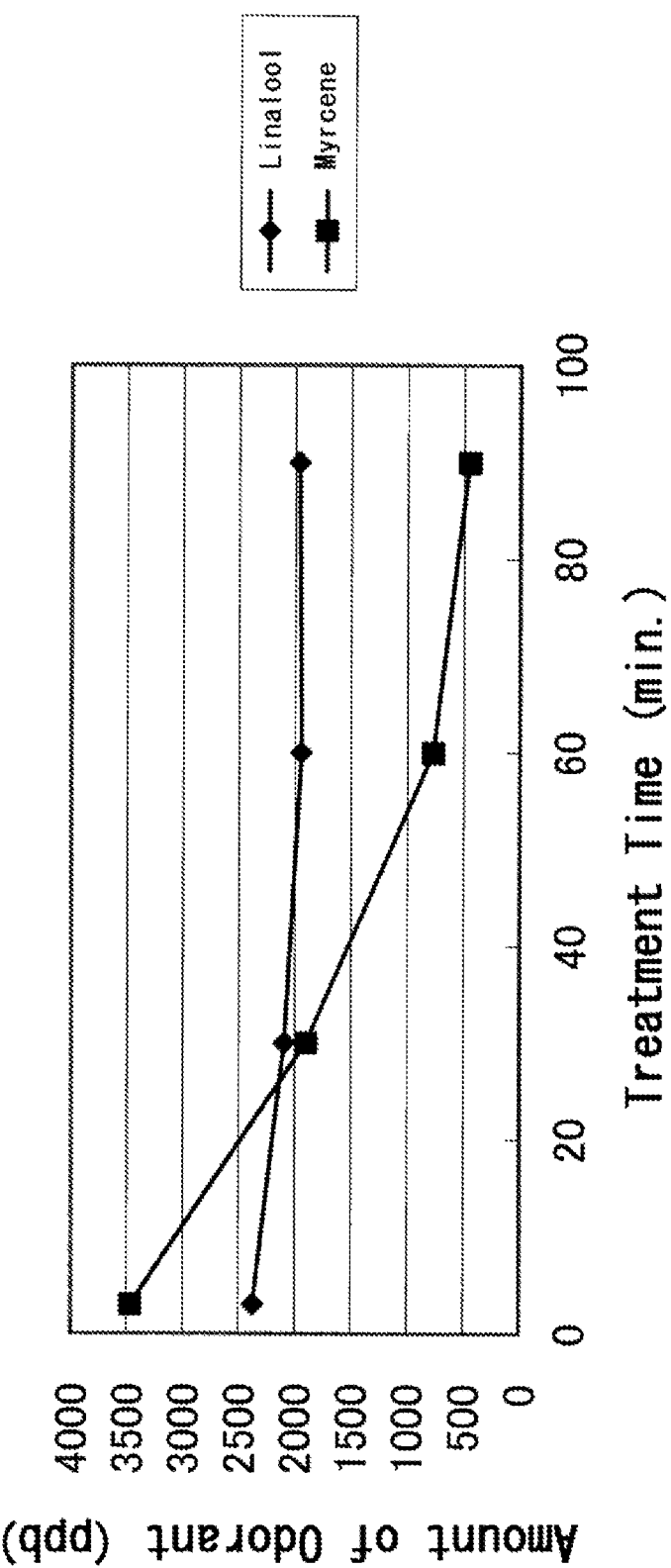
FIG. 12 is a graph showing the results in Example 3 of the present invention.

As shown in Table 5 and the graph of FIG. 12, the amount of the linalool as a hop aroma component was not substantially reduced (residual rate at 90 minutes=82.7%). Whereas, the amount of the myrcene as a raw hop odor component was remarkably reduced (residual rate at 90 minutes=13.0%).

Comparative Example 3

Using an apparatus 100 shown in FIG. 7 having no circulating ability, the hop-mixed liquid was subjected to the mixing treatment for 90 minutes under the following conditions.

In Comparative Example 3, the apparatus 100 corresponded to the apparatus 20 employed in Example 3 above, wherein the circulation line 2, the pump 3 and the spreader 7 were removed, but, a stirring blade 102 and a stirrer 103 were alternatively installed therein. Therefore, the apparatus employed in Comparative Example 3 corresponds to that of Example 3, wherein the circulating treatment was altered to the mixing treatment, which is a difference between them. Except this point, the other conditions for the employed apparatus have no difference.

Producing Apparatus
tank: volume 500 L
heater: jacket type heater (which is attached to the bottom of the tank)
heat source: water vapor (130° C.)
stirrer: mixing with a stirring blade (80 rpm)
empty portion: air
pressure in tank: atmospheric pressure
Hop-Mixed Liquid
hop: 3.75 kg of pellet (calculated value based on α (alpha) acids: 0.375 kg)
solvent: water (150 L)
mixing ratio (hop/solvent): about 2500 ppm
temperature of hop-mixed liquid: 94° C. to 99° C.
pH of hop-mixed liquid: about 5 to about 6

According to a similar procedure to that of Example 3, among the odorants contained in the hop-mixed liquid, the amounts of linalool as a hop aroma component and myrcene as a raw hop odor component were measured, respectively. The results are shown in the following Table 6 and the graph of FIG. 13.

TABLE 6

Comparative Example 3

| | Treatment Time (minute) | | | |
|---|---|---|---|---|
| | 3 | 30 | 60 | 90 |
| Linalool (ppb) | 2720 | 2513 | 2217 | 2147 |
| Myrcene (ppb) | 3722 | 3518 | 3556 | 3213 |

Figure 13:
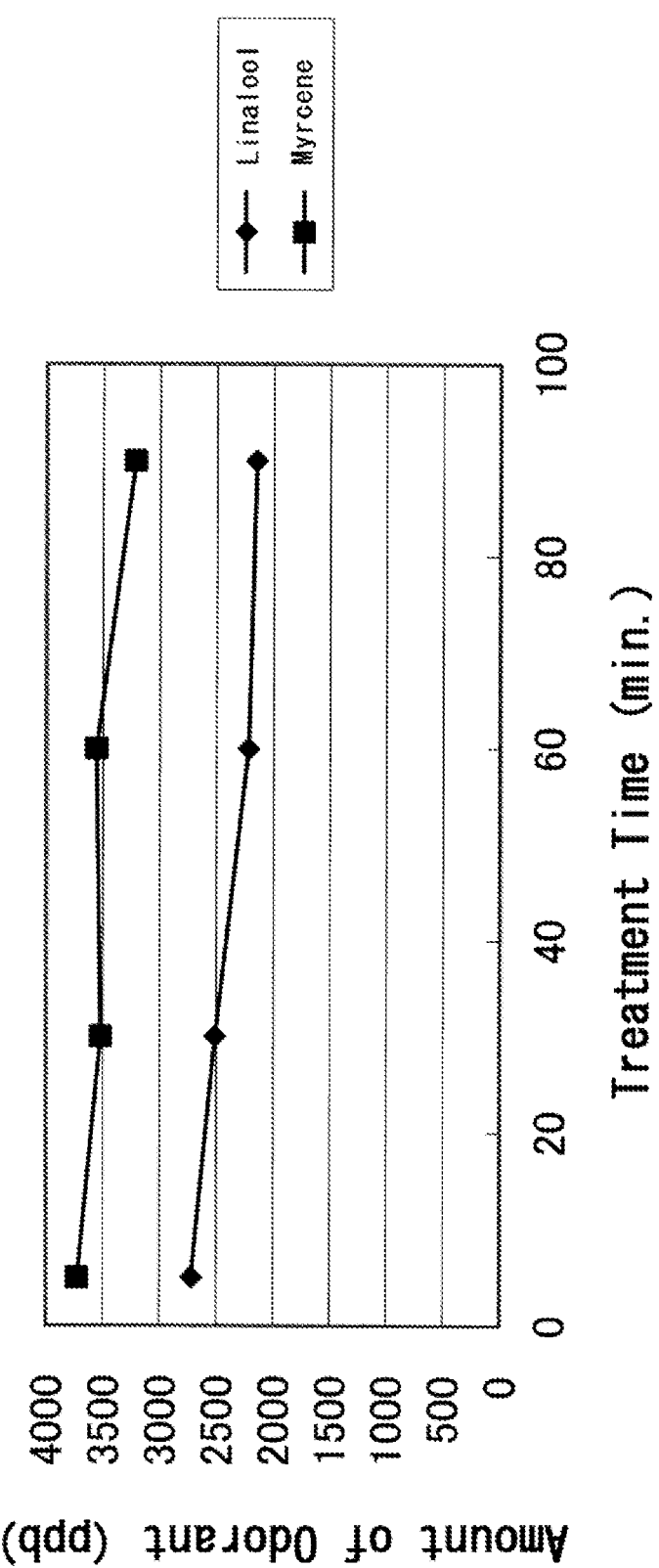
FIG. 13 is a graph showing the results in Comparative Example 3.

As shown in Table 6 and the graph of FIG. 13, according to Comparative Example 3, the amount of the linalool as a hop aroma component was not substantially reduced (residual rate at 90 minutes=78.9%). The amount of the myrcene as a raw hop odor component was not remarkably reduced (residual rate at 90 minutes=86.3%).

Comparison of Example 3 with Comparative Example 3

As described above, between the apparatus of Example 3 and the apparatus of Comparative Example 3, the difference was in the circulating treatment or the mixing treatment. Except that point, the other conditions had no difference. According to the method of Example 3 of the present invention utilizing the circulating treatment, the amount of the myrcene as the raw hop odor component could be remarkably reduced, while the amount of the linalool as the hop aroma component was maintained (FIG. 12).

Whereas, according to the apparatus of Comparative Example 3 utilizing the mixing treatment, the amount of the myrcene as the raw hop odor component could not be remarkably reduced (FIG. 13).

Based on such comparison of Example 3 with Comparative Example 3, it was found that the amount of the myrcene as the raw hop odor component could be remarkably reduced, while the amount of the linalool as the hop aroma component was maintained, by the circulation of the hop-mixed liquid.

Example 4

Using the apparatus 20 shown in FIG. 2 having the spreader 7 (see FIG. 3 for further details), the hop-mixed liquid was subjected to the circulating treatment for 30 minutes at a given temperature under the following conditions.

At the point where the circulating treatment started and 30 minutes were passed, the amounts of linalool as a hop aroma component and myrcene as a raw hop odor component were measured, respectively, according to a similar procedure of that of Example 1. The results are shown in the following Table 7 and the graph of FIG. 14.

Producing Apparatus
The apparatus is the same to that of Example 3.
Hop-Mixed Liquid
hop: 2.25 kg of pellet (calculated value based on α (alpha) acids: 0.225 kg)
solvent: water (180 L)
mixing ratio (hop/solvent): about 1250 ppm
treatment temperature of hop-mixed liquid (temperature at the start of the circulating treatment): 60° C., 70° C., 80° C., 90° C. or 99° C.
temperature of hop-mixed liquid before treatment: 60° C.
pH of hop-mixed liquid: about 5 to about 6

TABLE 7

Example 4

| | | Treatment Temperature (° C.) | | | | |
|---|---|---|---|---|---|---|
| | Before Treatment | 60 | 70 | 80 | 90 | 99 |
| Linalool (ppb) | 1511 | 1499 | 1396 | 1250 | 1162 | 1072 |
| Residual Rate of Linalool (%) | 100.0 | 99.2 | 92.4 | 82.7 | 76.9 | 70.9 |

TABLE 7-continued

Example 4

| | Before Treatment | Treatment Temperature (° C.) | | | | |
|---|---|---|---|---|---|---|
| | | 60 | 70 | 80 | 90 | 99 |
| Myrcene (ppb) | 2891 | 1813 | 1922 | 1527 | 1063 | 685 |
| Residual Rate of Myrcene (%) | 100.0 | 62.7 | 66.5 | 52.8 | 36.8 | 23.7 |

Figure 14:
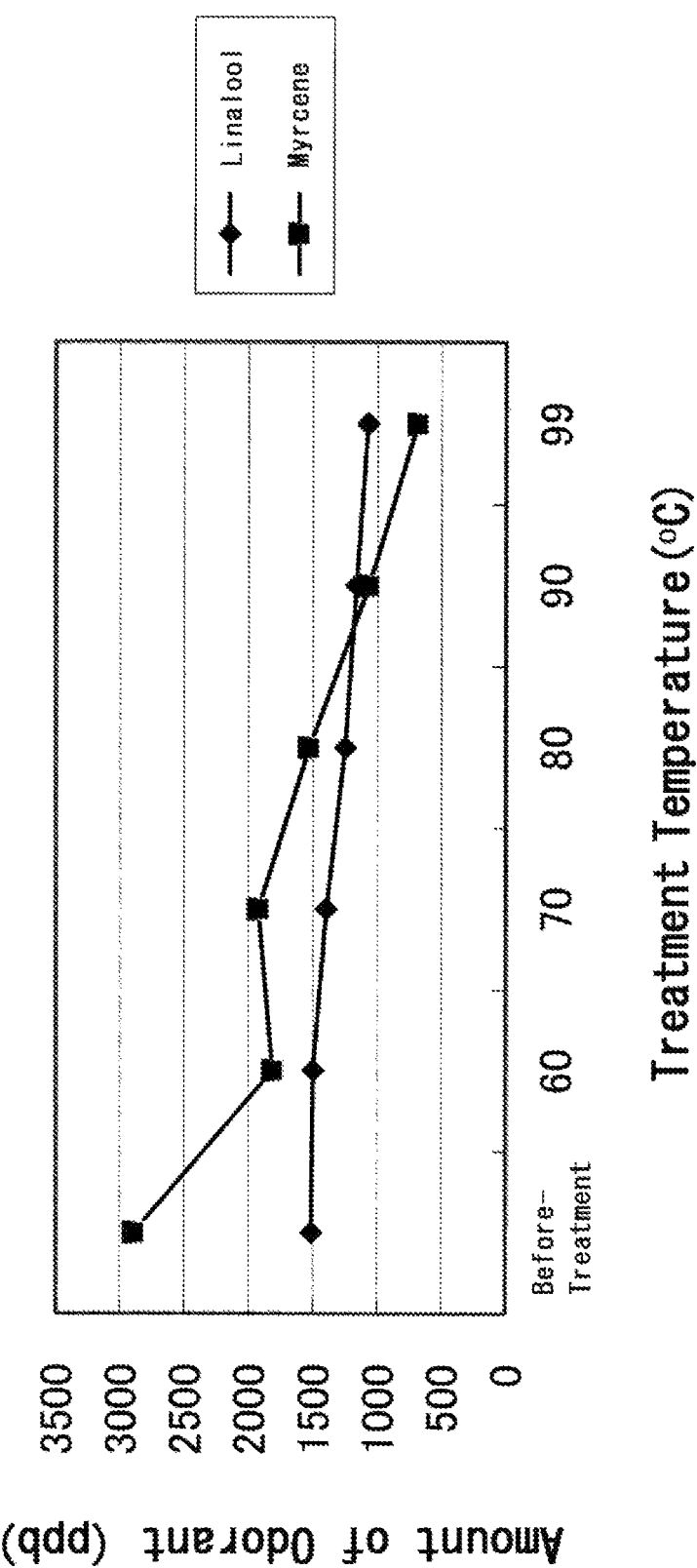
FIG. 14 is a graph showing the results in Example 4 of the present invention.

As shown in Table 7 and the graph of FIG. 14, it was found that, in Example 4, at every temperature, the amount of the myrcene as the raw hop odor component could be remarkably reduced, while the amount of the linalool as the hop aroma component was maintained (FIG. 14). Particularly, when the treatment temperature was 60° C. or more, the amount of myrcene could be further reduced significantly. At 80° C., while the residual rate of linalool could be 80% or more, the residual rate of myrcene could be 60% or less. At 90° C. or more, the residual rate of myrcene could be reduced to 40% or less.

INDUSTRIAL APPLICABILITY

The production method and the production apparatus according to the present invention can be utilized in a production process for a beer and a beer-like beverage to add an unprecedented and excellent hop aroma to a beverage such as a beer.

EXPLANATIONS OF LETTERS OR NUMERALS

1: tank
2: circulation line
3: pump
4: heater
4a: heater (or plate type heater)
4b: heater (or jacket type heater)
4c: heater (or coil type heater)
5: heat source
6: heat supplying line
7: spreader
8: solvent supplying line
10: apparatus according to the first embodiment of the present invention
20: apparatus according to the second embodiment of the present invention
30: apparatus according to the third embodiment of the present invention
40: apparatus according to the fourth embodiment of the present invention
100: apparatus employed in Comparative Example 1 or 3
101: tank
102: stirring blade
103: stirrer
104: heater (or jacket type heater)
105: heat source
106: heat supplying line
108: solvent supplying line
A: outlet
B: inlet
C: inlet
G: empty portion
L: hop-mixed liquid
S: liquid surface

The invention claimed is:

1. A method for producing a beer or a beer-like beverage, which comprises maintaining a hop-mixed liquid in a tank, which liquid contains a hop and a solvent, at a temperature less than the boiling point of the solvent, wherein at least a part of the hop-mixed liquid is withdrawn from the tank, and the liquid is supplied to an empty portion of the tank, again, to circulate the hop-mixed liquid through the tank.

2. The production method according to claim 1, wherein the solvent is water; a liquid wherein at least one of additives selected from the group consisting of acids, alkalis, salts, flavoring agents, acidulants, emulsifying agents, sweetening agents, bittering agents, saccharides, sugar syrups, starches, dietary fibers, food colors, coloring agents, barley extracts, malt extracts and yeast extracts is added to water; or a juice derived from at least one of plant materials selected from the group consisting of grains, beans, potatoes and sugarcanes.

3. The production method according to claim 1, wherein a proportion of the hop to the solvent in the hop-mixed liquid is 15000 ppm or less, as a basis of the weight, wherein a calculated value based on a (alpha) acids is employed as the weight of the hop.

4. The production method according to claim 1, wherein the hop-mixed liquid is maintained at a temperature from 40° C. or more to a temperature less than the boiling point of the solvent.

5. The production method according to claim 1, wherein the hop-mixed liquid is maintained at a temperature from 80° C. or more to a temperature less than the boiling point of the solvent.

6. A beer or a beer-like beverage, which is obtained by the production method according to claim 1.

* * * * *